United States Patent [19]

Takehara

[11] Patent Number: 5,548,504
[45] Date of Patent: Aug. 20, 1996

[54] POWER LINE LINKING APPARATUS FOR LINKING A POWER GENERATOR TO A COMMERCIAL POWER LINE

[75] Inventor: Nobuyoshi Takehara, Kyoto, Japan

[73] Assignee: Canon Kabushiki Kaisha, Tokyo, Japan

[21] Appl. No.: 130,919

[22] Filed: Oct. 4, 1993

[30] Foreign Application Priority Data

Oct. 19, 1992 [JP] Japan ................................ 4-280172

[51] Int. Cl.⁶ ............................................. H02M 7/23
[52] U.S. Cl. ................................................. 363/65; 363/71
[58] Field of Search ................................ 363/34, 37, 65, 363/71, 95, 131

[56] References Cited

U.S. PATENT DOCUMENTS

| | | | |
|---|---|---|---|
| 4,159,513 | 6/1979 | Gemp et al. | 363/71 |
| 4,546,423 | 10/1985 | Seki | 363/71 |
| 4,554,430 | 11/1985 | Belamaric | 363/71 |
| 4,674,025 | 6/1987 | Edwards | 363/71 |
| 5,008,797 | 4/1991 | Patel et al. | 363/37 |
| 5,031,088 | 7/1991 | Tanaka | 363/71 |
| 5,040,105 | 8/1991 | Dhyanchand et al. | 363/37 |
| 5,041,957 | 8/1991 | Dhyanchand et al. | 363/71 |
| 5,041,958 | 8/1991 | Dhyanchand et al. | 363/71 |
| 5,193,054 | 3/1993 | Galloway et al. | 363/65 |
| 5,272,612 | 12/1993 | Harada et al. | 363/65 |
| 5,311,419 | 5/1994 | Shires | 363/65 |

FOREIGN PATENT DOCUMENTS 59-198876  11/1984  Japan ................................ H02M 7/48

Primary Examiner—Jeffrey L. Sterrett
Attorney, Agent, or Firm—Fitzpatrick, Cella, Harper & Scinto

[57] ABSTRACT

A line linking inverter achieves load balance and protection for loss of one phase in linking with a single-phase three-wire distribution. Input terminals for connection with a solar cell array or the like (1) are connected in parallel to a pair of power conversion units (21, 22), and output terminals of the pair of power conversion units (21, 22) are connected in series. The pair of power conversion uniys (21, 22) are simultaneously controlled by a controller (3).

10 Claims, 4 Drawing Sheets

POWER LINE LINKING APPARATUS FOR LINKING A POWER GENERATOR TO A COMMERCIAL POWER LINE

BACKGROUND OF THE INVENTION

1. Field of the Invention

The present invention relates to power control, and more particularly to a power controller linked with a commercial power line and power source apparatus using such a power controller.

2. Description of the Related Art

In recent years, concern about environments and energy has rapidly grown with regard to such problems as warming of the earth due to large amount of $CO_2$ exhaust, radioactive contamination caused by accidents in nuclear power plants, and disposal of nuclear wastes. Correspondingly, wind power generation, geothermal power generation, solar cells, etc. have been studied with deeper interest. In these situations, solar cells and the like are especially expected as a regenerable, inexhaustible and clean energy source from all over the world. However, additional assistance is required to enable a power source such as a solar cell source, from which energy can be taken out only in the daytime under the sun, to be used as a stable energy source.

The simplest assistance is provided by storing output energy from a power source such as solar cells in a storage battery, and taking out the energy stored in the storage battery in the nighttime or under other circumstances in which no energy is output from the power source such as solar cells. Realizing such energy storage, however, requires a storage battery of considerable capacity. This makes the entire power generation system expensive. Also, service and maintenance of a steerage battery is troublesome. For these reasons, the above method using a storage battery is often employed in those remote places and isolated islands where power consumption is relatively small and other power sources are hard to obtain.

On the other hand, another method is known for realizing the above assistance, in which output of a power source such as wind power generation, geothermal power generation, solar cells, etc. is subjected to power control using a line linking inverter, and the controlled power is linked to a commercial AC power line (hereinafter referred to also as a line power source) for use in daily life so that the commercial power line may be utilized instead of the above storage battery. This method is regarded as the most likely one for more development and widespread use of a power source apparatus such as a solar cell system, because it requires neither an expensive steerage battery nor additional area for installation if solar cells and the like are installed on a roof.

One example of the above type power source apparatus is shown in FIG. 7. A solar cell array 1 is formed by combining a plurality of solar cells, one kind of power source, in series—parallel connection. DC power output from the solar cell array 1 is converted into AC power through a line linking inverter 2 including a DC/AC conversion unit 21 and a control unit 3. The AC power is further converted from a single-phase two-wire form into a single-phase three-wire form by an insulating transformer, and is supplied to various general usage loads 41 and 42. A single-phase three-wire commercial power line 5 is connected to the load 41, the load 42 and the line linking inverter 2. (Herein, a single-phase three-wire line corresponds to a two-phase line when considered from both sides of a neutral wire).

In the power source apparatus thus constructed, when the power consumed by both the load 41 and the load 42 is less than the power output from the line linking inverter 2, surplus power is supplied to the commercial power line 5 to produce the so-called reverse tidal power. When the power consumed by both the load 41 and the load 42 is larger than the power output from the line linking inverter 2, a shortage of power is compensated for by the power supplied from the commercial power line 5. By this construction, therefore, any of various type power source apparatus can be used as power generation equipment which provides energy in a stable manner.

Meanwhile, electric power is usually supplied to individual residences through a single-phase low-voltage distribution line. The single-phase low-voltage distribution line is divided into two types; i.e., a single-phase three-wire line and a single-phase two-wire line. Given the rated voltage of a single-phase two-wire line as Vn, a single-phase three-wire line can supply two levels of voltage, Vn and 2× Vn. In Japan, for example, because Vn=100 V, it can supply 100 V and 200 V. In the USA, it can supply 120 V and 240 V because Vn=120 V. Electric appliances for use in individual residences, particularly, those appliances stich as air conditioners which consume a large amount of power, have become increasingly popular. Single-phase three-wire distribution lines are very suitable to support a supply capacity accommodating such an increase in power demand. It is therefore believed that single-phase three-wire distribution lines will be more and more prevalent in future.

Generally, it is said that in order to safely link a power source apparatus to a power line, output of the power source apparatus should desirably match the power line in a distribution mode.

For that reason, as explained above with reference to FIG. 7, the transformer is connected to the output of the single-phase three-wire line linking inverter 2 for conversion into a single-phase three-wire output. Thus, this method has been regarded to be very advantageous in easily obtaining a single-phase three-wire output at the relatively small cost.

However, the inventor has found basic problems related to single-phase three-wire distribution lines are encountered when bringing the above-explained line linking system of reverse tidal power type into operation; i.e., problem of load balance and problem of protection loss of one phase.

(1) Problem of load balance

To enable consumers of electricity to safely use electric appliances, the supply voltage from electric power companies is set to fall within a certain range. (In Japan, for example, the supply voltage is held in the range of 95 to 107 V).

Since distribution lines have impedance, the voltage on the power transmitting side is usually higher than that on the power receiving side. In the case of a residence contracted for capacity of 3 KW, for example, the diameter of the distribution line is selected so that the supply voltage is in the stipulated range even when power is consumed at 30 A, and a voltage drop is considered in design so that the rated voltage of a transformer on a utility pole becomes 105 V.

In a single-phase three-wire line, however, the supply voltage may depart from the above stipulated range due to load imbalance. This often occurs because the line voltage varies depending on time to a larger extent than expected. FIG. 6 shows such time dependent variations of the line voltage in Japan. In FIG. 6, one phase (R-phase) represents a load current of 12 A and the other phase (T-phase) represents a load current of 2 A. At points A in FIG. 6, the voltage on the side consuming a smaller current with respect to a neutral wire exceeds 107 V, the upper limit voltage stipulated in Japan, and rises to 108 V. This problem of load balance also occurs in the USA. Ordinarily, electric appliances are able to operate at a voltage maximally exceeding the rated voltage by 10% and no practical troubles occur in power consumption for electric appliances. Such an event is however never said to be satisfactory from the side of distribution lines, because it apparently increases the loss. If a balancer as one kind of autotransformer is used, balance could be obtained between both the phases. But, using such a balancer with a large-capacity is expensive and costly. Further, a balancer is less likely to be used since electric appliances can be used without troubles in the absence of balancers.

On the other hand, the above-mentioned imbalance between both the phases gives rise to a severe disadvantage from the standpoint of linking a power source apparatus to a commercial line system.

Usually, in the event an excessive voltage rise such as an abnormal voltage occurs, the line linking system is stopped by an overvoltage relay for protection of the line linking system.

Therefore, when the voltage on one phase side increases excessively due to imbalance between both phase sides, the line linking system is entirely stopped, meaning that if there is an allowance to accommodate reverse tidal power on the other phase side, supply of such reverse tidal power must be stopped. This leads to a large loss from the standpoint of effectively utilizing the power from the power source apparatus.

In a solar power generation system wherein a transformer is connected to an output of a single-phase two-wire line linking inverter for conversion into a single-phase three-wire output, it seems that the transformer serves as a balancer and the problem of load balance does not exist. However, if the transformer itself is not balanced, an imbalance between both phase sides occurs. Because the line linking system of FIG. 7 includes the single power conversion unit which can be controlled, using a completely balanced transformer is the only one effective method to eliminate such imbalance.

(2) Problem of protection for lack of one phase

This problem of protection for loss of one phase is more intricate and more difficult to cope with than the above problem of load balance. Here, the term "loss of one phase" implies an event wherein one phase side of a single-phase three-wire line (i.e., an electromotive force in different phase at the same frequency) is placed in an open, power-failed state by an accident such as breaking of the line distribution line. In that event, there is a fear that loads concentrated on the other remaining phase will cause an overcurrent, and the power source apparatus should be stopped from the standpoint of safety.

In the line linking system of FIG. 7, however, the presence of the aforesaid transformer makes it difficult to stop the power source apparatus by detecting the above event. More specifically, if prior to start-up of the line linking system, the overcurrent state could be detected by providing a breaker between the transformer and the output terminal, and disconnecting the transformer at the breaker. But, during operation of the power source apparatus, the overcurrent state is difficult to detect. This is because the transformer serves as a balancer and closely couples both phases each other. While the possibility of the line linking inverter breaking under operation in the overcurrent state is small or substantially zero, the overcurrent state is nothing but an abnormal operating condition and the power source system should be desirably stopped.

SUMMARY OF THE INVENTION

With a view of solving the problems as set forth above, an object of the present invention is to provide a high-performance and safe power controller which can achieve load balance and protection for loss of one phase in linking with a single-phase three-wire distribution line, and a power source apparatus using such a power controller.

To achieve the above object, the present invention employs a power controller including a plurality of power conversion units connected to input terminals in parallel and connected to output terminals in series, one being provided for each of plural phases, and a controller for simultaneously controlling the plurality of power conversion units. The above power controller preferably includes two power conversion units.

Also, in the above power controller, the controller controls the power conversion units in such a way as to reduce a difference between phase voltages.

Alternatively, in the above power controller, the controller controls the power conversion units in such a way as to reduce a neutral wire current.

In the above power controller, the power conversion units respectively have insulating transformers. In this case, the insulating transformers each have a high frequency filter. In the power controller, the power conversion units are DC/AC power conversion units. As an alternative, the power conversion units are AC/AC power conversion units.

To achieve the above object, the present invention is also intended for a power source apparatus including a power source, a plurality of power conversion units connected to the power source in parallel and connected to a line power source in series, one being provided for each of plural phases, and a controller for simultaneously controlling the plurality of power conversion units.

In the above power source apparatus, the controller controls the power conversion units in such a way as to reduce a difference between phase voltages. Alternatively, the controller controls the power conversion units in such a way as to reduce a neutral wire current. In the above power source apparatus, the power conversion units respectively have insulating transformers. In this case, the insulating transformers each have a high frequency filter. In the power source apparatus, the power source may include at least one of solar cells, a wind power generator and a geothermal power generator. Further, in the above power source apparatus, the power conversion means are DC/AC power conversion units. As an alternative, the power conversion means are AC/AC power conversion units.

The intention of the present invention is not impaired even if each of the DC/AC conversion units or the AC/AC conversion units includes a plurality of power conversion units. Also, the power conversion units may have their own controller which are operated under coordination. It is essential that the power conversion units are allocated one for each phase and are simultaneously controlled independently of each other.

Since the pair of power conversion units are controlled by the single controller, they operate as one line linking inverter when viewed from the input side for connection with any of various power sources such as solar cells. Accordingly, maximum power point tracking control (MPPT) and other control methods having been practiced hitherto will not be adversely affected.

Thus, in the line linking inverter of the present invention, the power conversion units are allocated one for each phase to enable conversion control for each of two phases. Accordingly, the inverter can be operated in a load balanced state in any situation. Also, voltage balance between both phases can be perfectly achieved. As a result, reverse tidal power can be produced to full capacity of a distribution line, and a loss in the distribution line can be reduced correspondingly.

Further, in the line linking inverter of the present invention, since a single-phase three-wire output is originally produced, transformers are not necessarily needed for conversion from a single-phase two-wire output into a single-phase three-wire output. Therefore, coupling between both phases can be made so loose as to readily enable protection on for a missing phase.

DESCRIPTION OF THE PREFERRED EMBODIMENTS

Hereinafter, a power controller of the present invention and a power source apparatus using the power controller will be described in detail and concretely in conjunction with embodiments.

(Embodiment 1)

Figure 1:
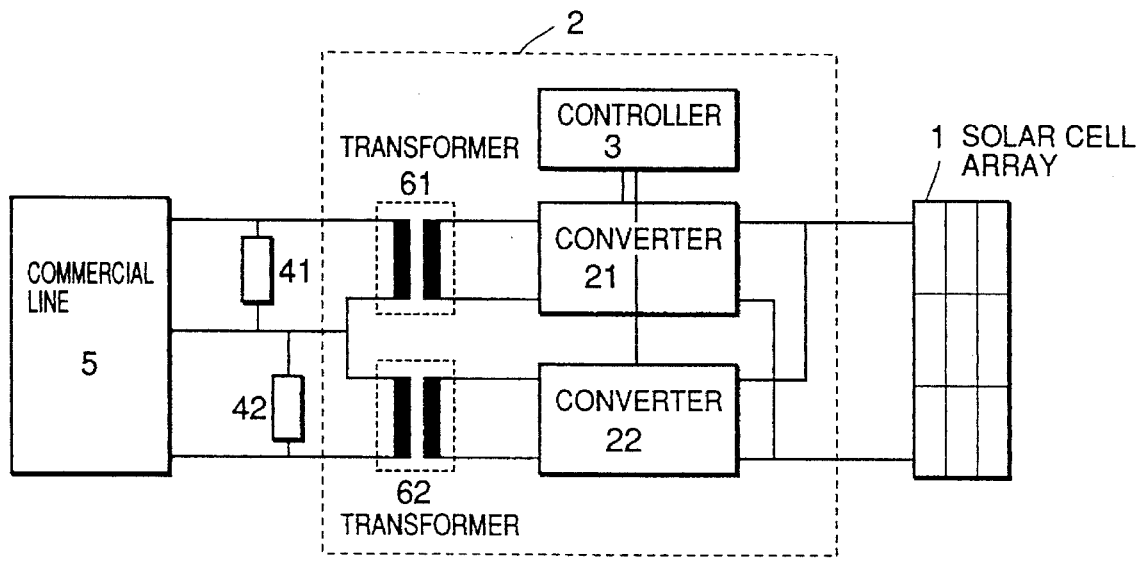
FIG. 1 is a schematic explanatory view of a line linking inverter according to Embodiment 1 of the present invention.

FIG. 1 shows a power controller according to Embodiment 1 of the present invention and a power source apparatus using the power controller. In the power source apparatus, a solar cell array 1 is made by combining a plurality of solar cell modules in series—parallel connection. DC power generated by the solar cell array 1 is input in parallel to a pair of power conversion units, i.e., DC/AC conversion unit 21 and DC/AC conversion unit 22. The DC/AC conversion unit 21 and the DC/AC conversion unit 22 function to switch the DC input into positive and negative polarities alternately, i.e., to convert the DC input into an AC power, to supply it to loads. As a practical means of the above DC/AC conversion, a voltage type current control PWM technique is generally used for line linking at lower voltages. The voltage type current control PWM technique is featured by providing an output waveform with very small distortions in high harmonics. The above switching is carried out by using switching devices such as power transistors, power MOSFETs, IGBTs, SITs, thyristors, and GTOs. For output capacity on the order of several KW possibly for individual residences, those switching devices which are of the self-extinction type and can take high switching frequency, such as power transistors, power MOSFETs and IGBTs, are used.

The pair of DC/AC conversion unit 21 and DC/AC conversion unit 22 are controlled by a controller 3 independently of each other. The controller 3 controls gate signals applied to the switching elements in accordance with the AC ouput voltage and current and the DC output voltage and current. Also, the controller 3 has functions to protect the apparatus itself by stopping the gate signals or actuating mechanical breaker means upon the occurrence of an abnormality such as an overcurrent or overvoltage. The controller 3 can be either of digital and analog configuration. The digital control configuration is superior in having a high degree of freedom in design, while the analog control configuration is superior in being less likely to cause abnormal operation owing to continuous control.

The outputs from the pair of DC/AC conversion unit 21 and DC/AC conversion unit 22 are respectively introduced to a pair of insulating transformers 61 and 62 which are operated at the commercial frequency independently of each other. Outputs from the pair of insulating transformers 61 and 62 are connected in series, thereby producing a single-phase three-wire power. Since the pair of insulating transformers 61 and 62 are independent of each other, no magnetic coupling exists between both phases.

A line linking inverter 2 of Embodiment 1 includes the pair of DC/AC conversion units 21 and 22, the pair of insulating transformers 61 and 62, and the single controller 3. With the line linking inverter 2 thus constructed, the current and voltage can be freely controlled for each phase, making it possible to absorb imbalance between load impedance 41 and load impedance 42. The balance control can be performed by a method of reducing the neutral wire current incoming from the line, or a method of directly detecting the voltages in both phases and reducing a difference therebetween.

Figure 4:
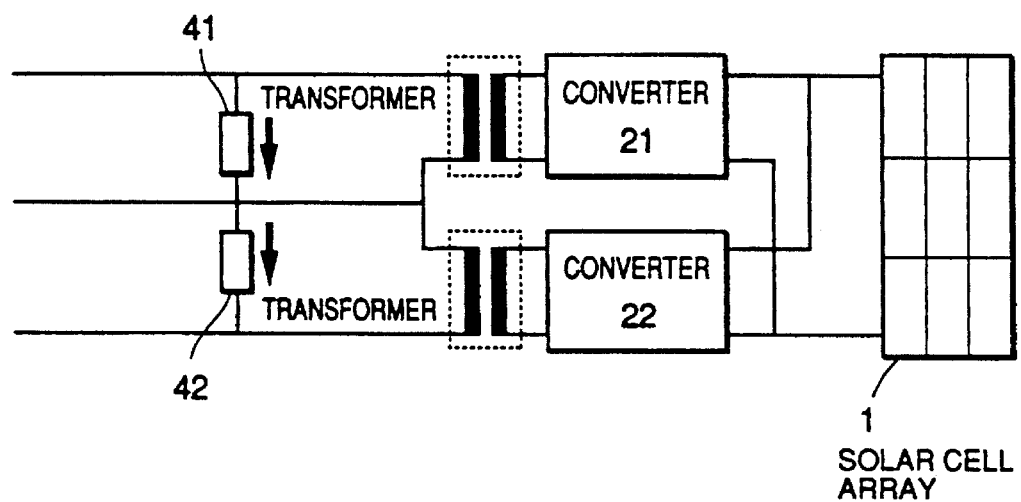
FIG. 4 is an explanatory view showing an example of operation under load balance between both phases in the line linking inverter.

As one practical example, the power source apparatus operates as follows. Assuming that the power consumed by the load impedance 41 is 300 W, the power consumed by the load impedance 42 is 700 W, and the output of the line linking inverter 2 is 1400 W, the load impedance 41 is supplied with 500 W and the load impedance 42 is supplied with 900 W, respectively, whereby the reverse tidal power of 200 W is supplied to the commercial power line 5 for each phase. The situation in this case is shown in FIG. 4. In this case, the current flowing through the neutral wire is ideally zero and the loss in the distribution line is smaller than that resulted in the case of giving rise to imbalance.

Figure 5A:
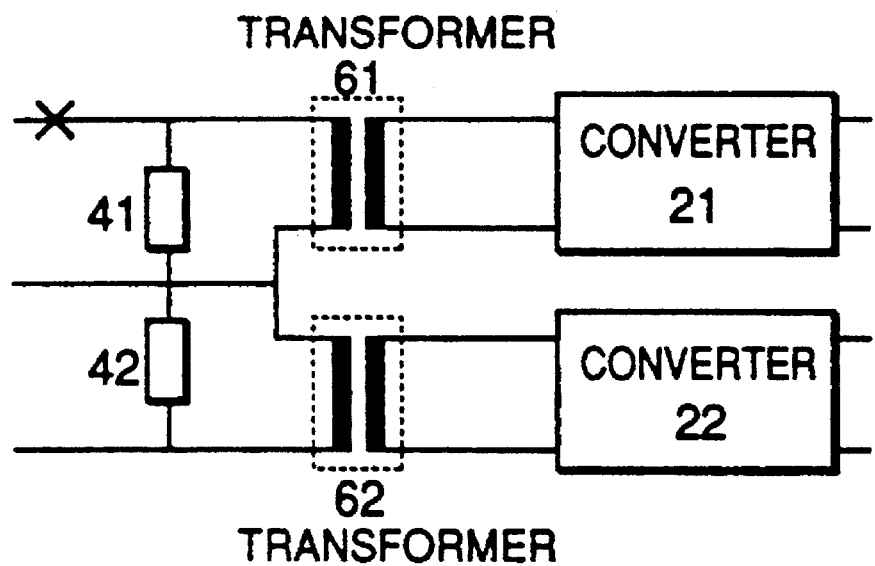
FIGS. 5A and 5B are explanatory views showing examples of operation under protection for loss of one phase in the line linking inverter.
Figure 5B:
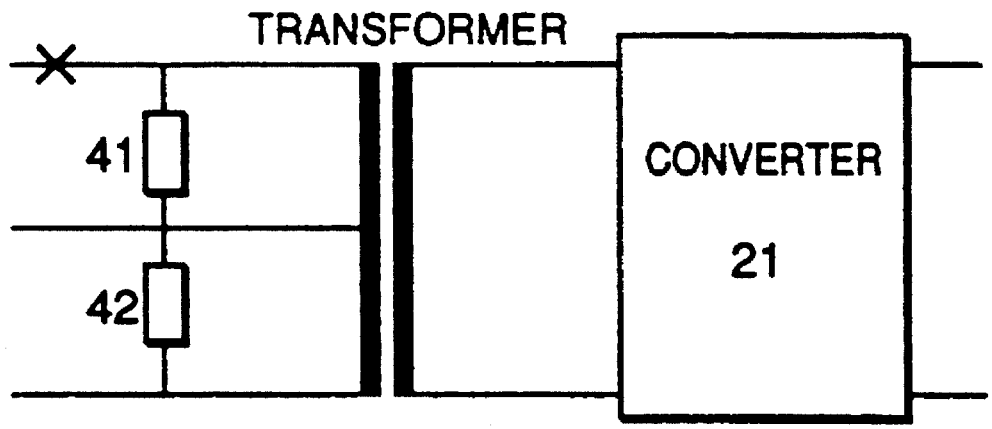
Figure 6:
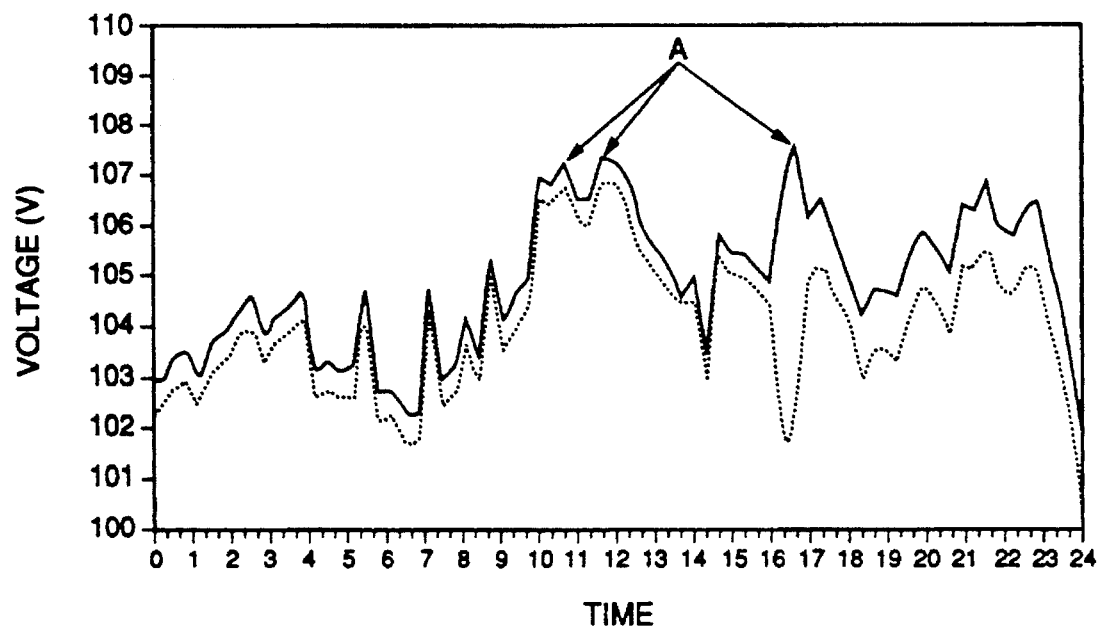
FIG. 6 is a chart showing measured data of voltage in a single-phase three-wire line.
Figure 7:
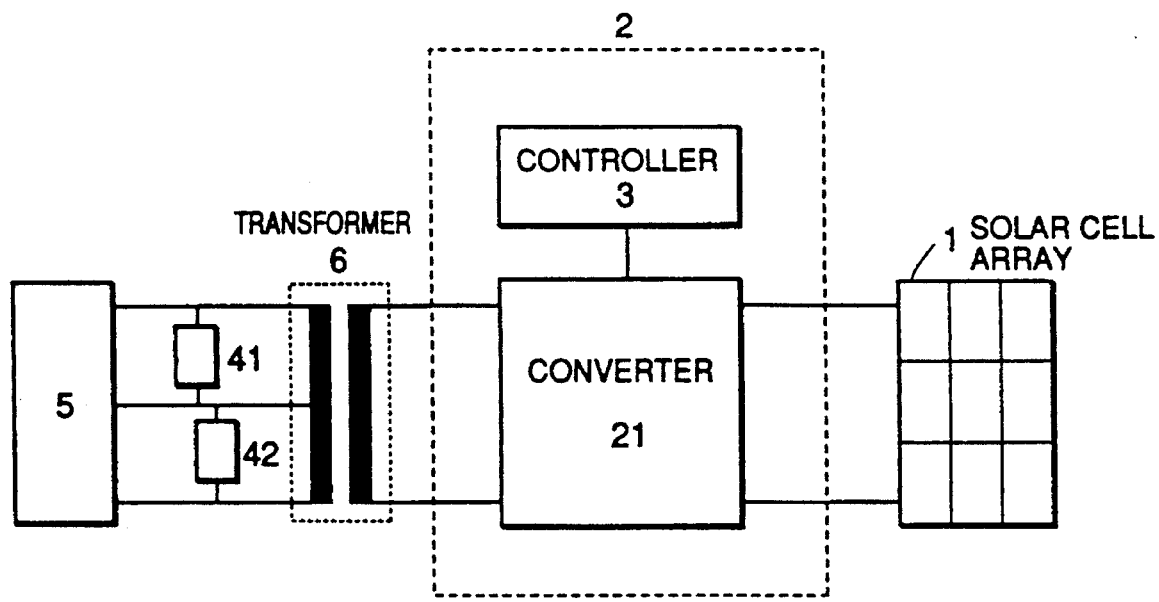
FIG. 7 is an explanatory view of a line linking inverter for comparison with the present invention.

When loss of one phase occurs, the line linking inverter 2 of Embodiment 1 can detect such loss of one phase, because the pair of insulating transformers are independent of each other and no magnetic coupling is present between both phases. More specifically, FIG. 5A represents one example of detecting the loss of one phase in a stopped state of the line linking inverter 2. In the line linking inverter 2 of Embodiment 1, with no magnetic coupling between both phases, no voltage is produced in the failed phase side upon the loss of one phase. Therefore, the loss of one phase can be detected by an insufficient voltage relay, for example, provided between the load impedance and the insulating transformer. On the contrary, in the conventional line linking inverter, because the single transformer establishes magnetic coupling between both phases in a stopped state, as shown in FIG. 5B, the voltage is normal in the failed phase side as well and the loss of one phase cannot be detected by any method.

Also, during operation of the line linking inverter 2, the loss of one phase brings the line into a lost state on the one phase side in the line linking inverter 2 of Embodiment 1. Therefore, the reference voltage is not produced and the line linking inverter 2 stops its operation. On the contrary, the conventional line linking inverter continues operation even upon the loss or one phase occurring during the operation, because the power is supplied from the normal phase side to the failed phase side.

It is seen from the above description that the construction of Embodiment 1 can completely achieve the load balance and the protection for loss of one phase. Note that the insulating transformer 61 and the insulating transformer 62 may be provided outside the line linking inverter 2 in the construction of Embodiment 1.

(Embodiment 2)

Figure 2:
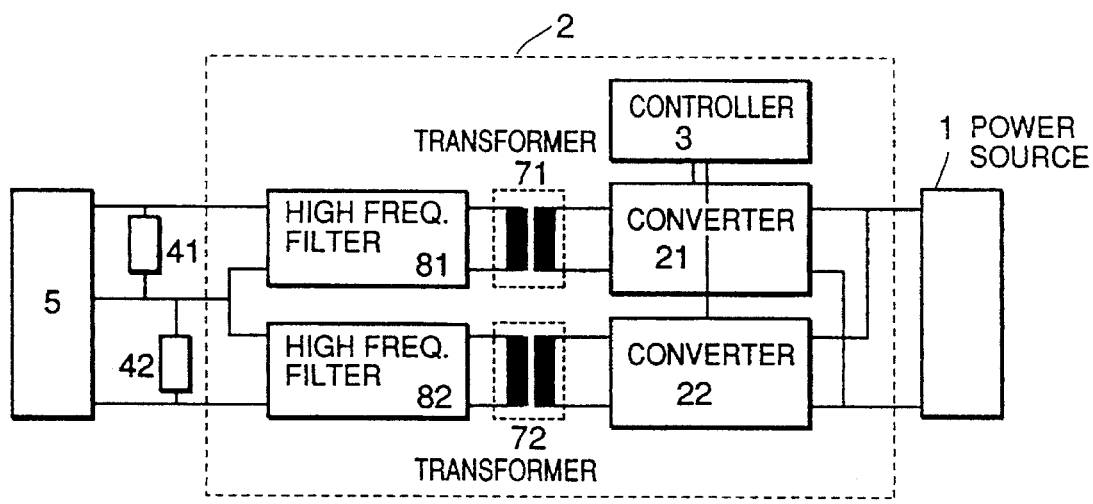
FIG. 2 is a schematic explanatory view of a line linking inverter according to Embodiment 2 of the present invention.

FIG. 2 shows a line linking inverter according to Embodiment 2 of the present invention. In the line linking inverter of Embodiment 2, an insulating transformer 71 and an insulating transformer 72 of high frequency type are used for switching the outputs of the DC/AC conversion unit 21 and the DC/AC conversion unit 22 at high frequency. In this case, a high frequency filter 81 and a high frequency filter 82 are respectively disposed downstream of the insulating transformers 71 and 72 to remove high frequency components, and outputs of the high frequency filters 81 and 82 are connected in series to provide single-phase three-wire power.

Embodiment 2 operates exactly in the same manner as above Embodiment 1. Because of adopting the high frequency insulating technique using the insulating transformers 71 and 72 of high frequency type and the high frequency filters 81 and 82, Embodiment 2 is also advantageous, depending on the switching frequency, in being much more compact and causing a smaller loss than Embodiment 1 which employs the insulating transformers for commercial frequency.

(Embodiment 3)

Figure 3:
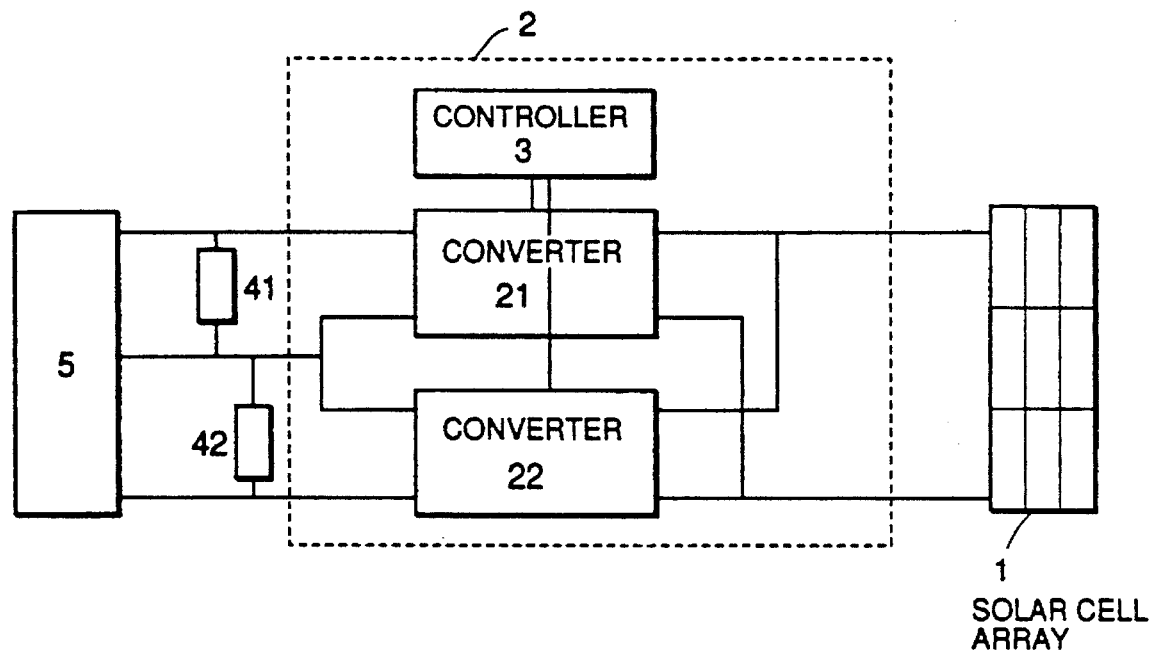
FIG. 3 is a schematic explanatory view of a line linking inverter according to Embodiment 3 of the present invention.

FIG. 3 shows a line linking inverter according to Embodiment 3 of the present invention. The line linking inverter of Embodiment 3 has no transformers. The intention of the present invention can be perfectly achieved even in the case of using no insulating transformers as in this embodiment. Thus, the construction of Embodiment 3 is the simplest one of the inverter for use with the present invention. Additionally, the absence of insulating transformers results in smaller loss.

In the construction of Embodiment 3, however, there is a problem that the DC output of the solar cell array 1 may flow into the distribution line if the DC/AC conversion unit 21 or the DC/AC conversion unit 22 fails in a short-circuiting mode. Accordingly, close care is required in design of the protective function. Note that as of June, 1992, it is not legally allowed to connect solar power generation systems with distribution lines without insulating transformers disposed therebetween in Japan, but it is permitted in some districts of the USA and other countries.

In the case where the power source of the power source apparatus in Embodiment 1 is changed from solar cells to wind power generation, a power controller and a power source apparatus using the power controller can be made, in which the problems of load balance and loss of one phase are solved with a simple construction similarly to Embodiment 1, by replacing the power conversion units with cycloconverters such as AC/AC conversion units.

The line linking inverter of the present invention constructed as set forth above has the following advantages and, therefore, is highly valuable for purpose of practical use in providing a novel, high-performance and safe inverter to be linked with a single-phase three-wire distribution line:

(1) Since power conversion units are provided for both phases in one-to-one relation and independent of each other, loads in both phases can be completely balanced as viewed from the distribution line;

(2) Since the voltage is prevented from concentrating in one phase side, reverse tidal power can be produced to full capacity of the distribution line. It is therefore possible to reduce the loss in the distribution line and to effectively utilize power source energy of the power source apparatus; and (3) Because of loose coupling between both phases, the function of protecting the inverter upon loss of one phase can be readily realized.

What is claimed is:

1. A line linking apparatus comprising:

a DC power generator for generating power by solar cells;

a pair of DC/AC converters connected in parallel to output terminals of said DC power generator; and a wiring for interconnecting output terminals of said pair of DC/AC converters and terminals of a commercial power line in a single-phase, three-wire mode.

2. A line linking apparatus comprising:

a DC power generator for generating power by solar cells;

a pair of DC/AC converters connected in parallel to output terminals of said DC power generator;

a pair of transformers connected in series, respectively, to output terminals of said pair of DC/AC converters; and a wiring for interconnecting terminals of said pair of transformers and terminals of a commercial power line in a single-phase, three-wire mode.

3. A line linking apparatus comprising:

a DC power generator for generating power by solar cells;

a pair of DC/AC converters connected in parallel to output terminals of said DC power generator;

control means for detecting an over-voltage for each of said pair of DC/AC converters independently based on an AC output voltage value and a DC input voltage value and controlling go that operation of said converters is stopped in the event of an overvoltage;

a pair of transformers connected in series respectively to output terminals of said pair of DC/AC converters; and a wiring for interconnecting terminals of said pair of transformers and terminals of a commercial power line in a single-phase, three-wire mode.

4. A line linking apparatus comprising:

a DC power generator for generating power by solar cells;

a pair of DC/AC converters connected in parallel to output terminals of said DC power generator;

a pair of high-frequency filters connected in series, respectively, to said pair of DC/AC converters; and a wiring for interconnecting terminals of said pair of high-frequency filters and terminals of a commercial power line in a single-phase, three-wire mode.

5. A line linking apparatus comprising:

a DC power generator for generating power by solar cells;

a pair of DC/AC converters connected in parallel to output terminals of said DC power generator;

a pair of transformers connected in series, respectively, to output terminals of said pair of DC/AC converters;

a pair of high-frequency filters connected in series respectively to said pair of transformers; and a wiring for interconnecting terminals of said pair of high-frequency filters and terminals of a commercial power line in a single-phase, three-wire mode.

6. A line linking apparatus comprising:

a DC power generator for generating power by solar cells;

a pair of DC/AC converters connected in parallel to output terminals of said DC power generator;

control means for detecting an over-voltage for each of said pair of DC/AC converters independently based on an AC output voltage value and a DC input voltage value and controlling so that operation of said converters is stopped in the event of an overvoltage;

a pair of transformers connected in series, respectively, to output terminals of said pair of DC/AC converters;

a pair of high-frequency filters connected in series respectively to said pair of transformers; and a wiring for interconnecting terminals of said pair of high-frequency filters and terminals of a commercial power line in a single-phase, three-wire mode.

7. A line linking apparatus comprising:

a DC power generator for generating power by solar cells;

a pair of DC/AC converters connected in parallel to output terminals of said DC power generator;

control means for detecting an over-current for each of said pair of DC/AC converters independently base don an AC output current value and a DC input current value and controlling so that operation of said converters is stopped in the event of an overcurrent;

a pair of transformers connected in series, respectively, to output terminals of said pair of DC/AC converters; and a wiring for interconnecting terminals of said pair of transformers and terminals of a commercial power line in a single-phase, three-wire mode.

8. A line linking apparatus comprising:

an AC power generator for generating power by a wind power generator;

a pair of AC/AC converters connected in parallel to output terminals of said AC power generator; and a wiring for interconnecting output terminals of said pair of AC/AC converters and terminals of a commercial power line in a single-phase, three-wire mode.

9. A line linking apparatus comprising:

an AC power generator for generating power by a wind power generator;

a pair of AC/AC converters connected in parallel to output terminals of said AC power generator;

a pair of transformers connected in series, respectively, to output terminals of said pair of AC/AC converters; and a wiring for interconnecting output terminals of said pair of transformers and terminals of a commercial power line in a single-phase, three-wire mode.

10. A line linking apparatus comprising:

an AC power generator for generating power by a wind power generator;

a pair of AC/AC converters connected in parallel to output terminals of said AC power generator;

control means for detecting an overvoltage for each of said pair of AC/AC converters independently based on an AC output voltage value and an AC input voltage value and controlling so that operation of said converters is stopped in the event of an overvoltage;

a pair of transformers connected in series respectively to output terminals of said pair of AC/AC converters; and a wiring for interconnecting output terminals of said pair of transformers and terminals of a commercial power line in a single-phase, three-wire mode.

* * * * *